UNITED STATES PATENT OFFICE.

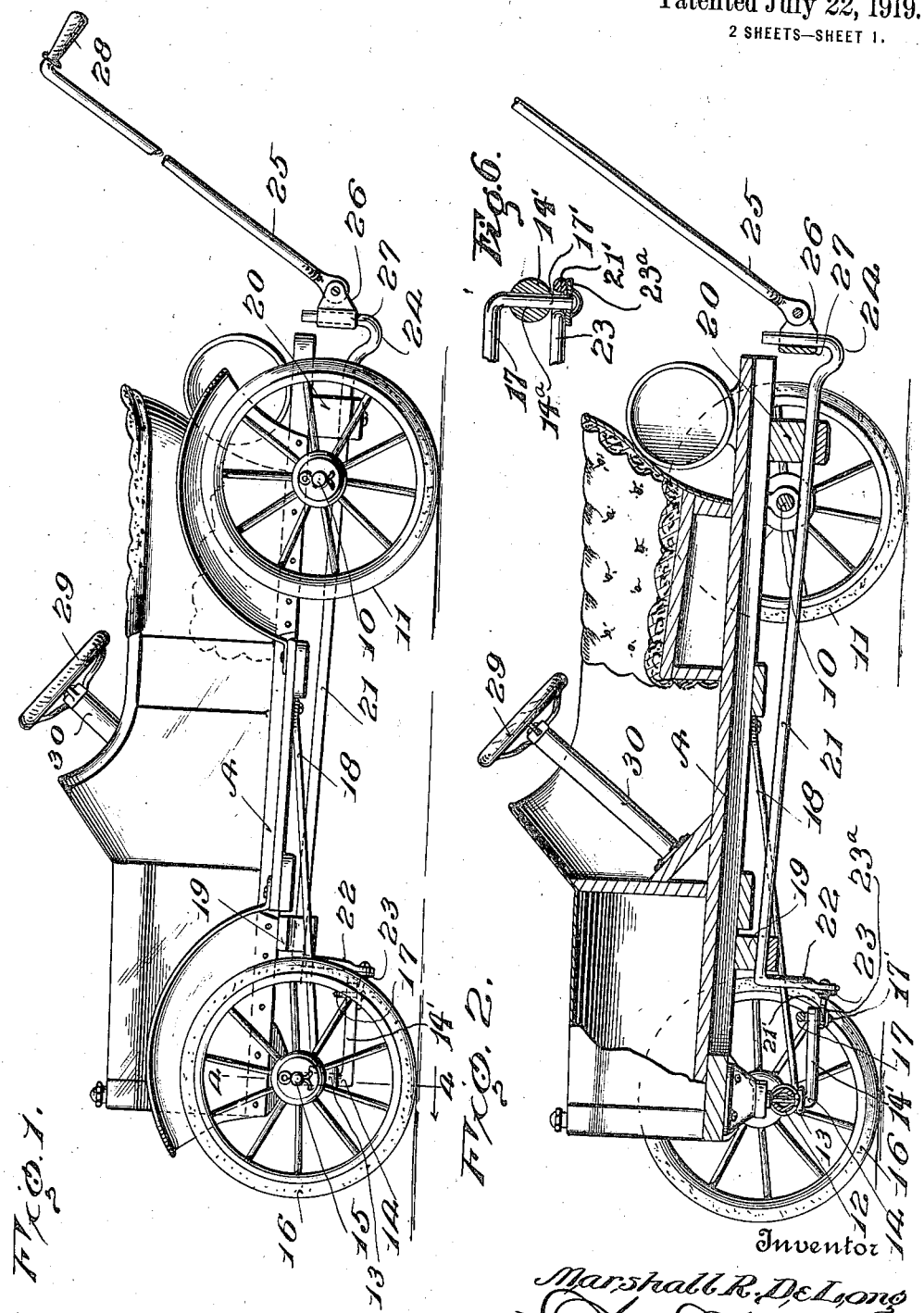

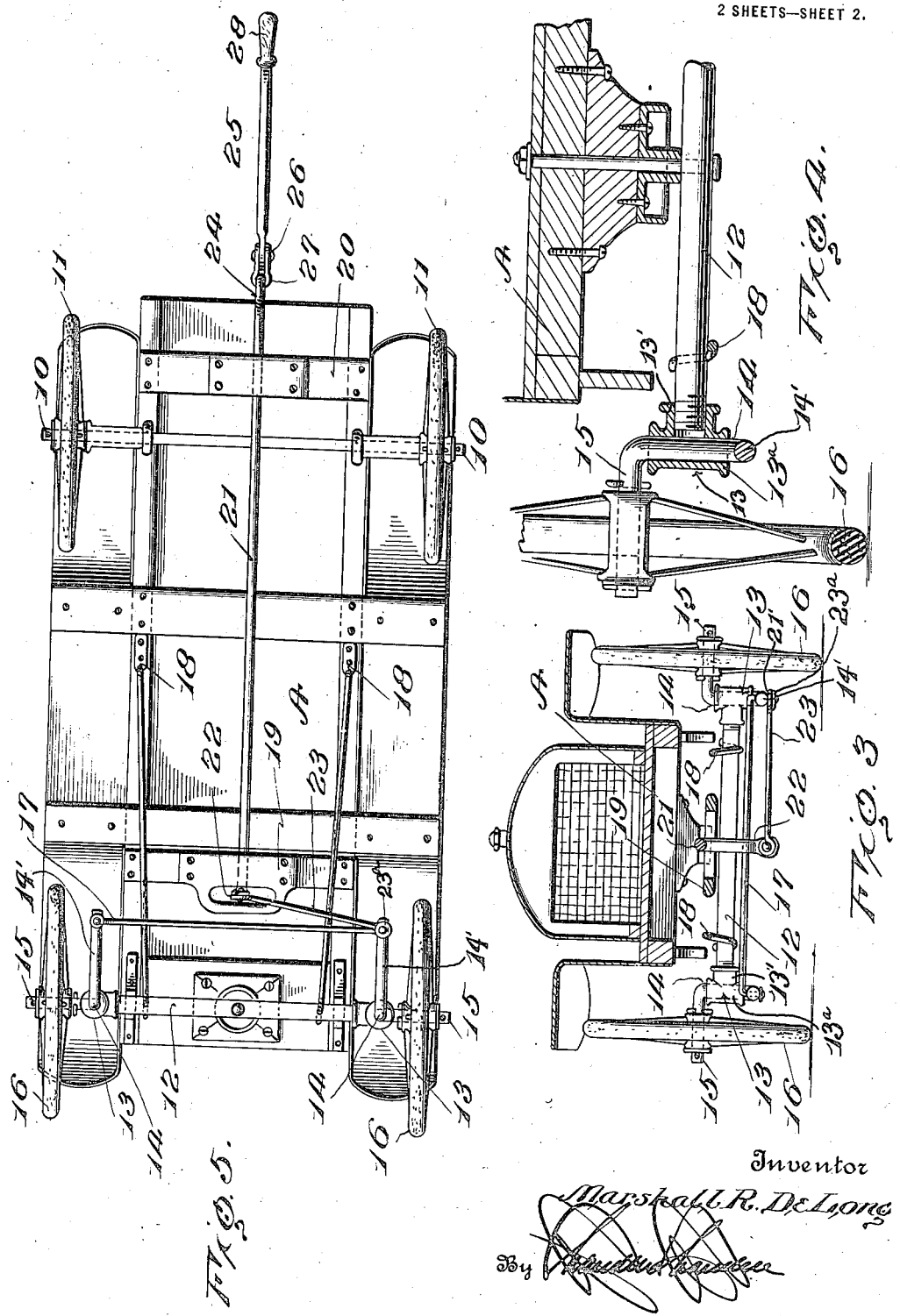

MARSHALL R. DE LONG, OF EAST LIVERPOOL, OHIO.

BABY-MOBILE.

1,310,651.　　　　Specification of Letters Patent.　　Patented July 22, 1919.

Application filed January 9, 1919. Serial No. 270,328.

*To all whom it may concern:*

Be it known that I, MARSHALL R. DE LONG, a citizen of United States, residing at East Liverpool, in the county of Columbiana, State of Ohio, have invented certain new and useful Improvements in Baby-Mobiles; and I do hereby declare the following to be a full, clear, and exact description of the invention, such as will enable others skilled in the art to which it appertains to make and use the same.

The invention relates to a baby vehicle, and more particularly to the class of carriages or mobiles imitative of a miniature of the automobile type.

The primary object of the invention is, the provision of a vehicle of this character, wherein the steering gear is controlled and operated by a person walking in the rear thereof, and the controlling lever for the steering gear may be utilized for pushing the vehicle, thereby enabling the advancement of said vehicle and the guiding of the same in its course.

Another object of the invention is, the provision of a vehicle of this character, wherein the body thereof simulates or is imitative of an automobile and is of miniature type so as to present a unique, attractive and fanciful appearance to serve in the transportation of a child and to satisfy the occupant, as it appeals to the fancy of the user thereof, the vehicle being steered or guided in a novel manner.

A further object of the invention is, the provision of a vehicle of this character, which is fanciful and attractive in appearance, simple in construction and effective in operation, as well as inexpensive to manufacture.

With these and other objects in view, the invention consists in the features of construction, combination and arrangement of parts as will hereinafter be fully described, illustrated in the accompanying drawing and pointed out in the claims hereunto appended.

In the accompanying drawing:

Figure 1, is a side elevation of a vehicle constructed in accordance with the invention.

Fig. 2, is a vertical, longitudinal sectional view thereof.

Fig. 3, is a vertical transverse sectional view taken at the point of the crank of the operating rod of the steering gear.

Fig. 4, is a fragmentary sectional view on the line 4—4 of Fig. 1.

Fig. 5 is a bottom plan view.

Fig. 6 is a detail view of a part of the steering mechanism partly in section.

Similar reference characters indicate corresponding parts throughout the several views in the drawing.

Referring to the drawings in detail, A, designates generally, the body of the vehicle which is constructed in any suitable manner to simulate or imitate an automobile of any approved type, preferably of the roadster style.

Supporting the body is a running gear provided with steering mechanism, hereinafter fully described.

The running gear comprises a stationary rear axle 10 on the axle spindles of which are journaled the rear wheels 11, while at the front of the body A is suitably mounted the stationary front axle 12. Engaged with the ends of the axle 12 are T elements 13, the stem branches 13' of which are screwed upon the ends of the axle, with the hollow head portions 13ª of these elements extending vertically, for the reception of the central vertical portions 14 of front stub axle cranks 15, upon which are journaled the steering wheels 16 of the vehicle. The vertical portions 14 carry at their lower ends rearwardly extending crank arms at right angles to the stub axles, these crank arms being indicated at 14'. Each of these crank arms has a vertical passage 14ª therethrough, and these vertical passages receive the downwardly turned end portions 17' of a tie rod 17, which thus connects the crank arms so that the front wheels 16 will move in unison. One of the end portions 17' extends below the crank arm 14' through which it is engaged, for a purpose to be later explained.

Connected to the front axle 12, are brace bars 18 which are connected to the body frame A thereby reinforcing and rigidly holding said front axle.

Secured to the under side of the frame of the body A, are front and rear cross pieces 19 and 20 respectively, in which is journaled an operating shaft 21 of the steering mechanism. The shaft 21 is disposed longitudinally of the vehicle centrally thereof and is formed at its front end with a crank arm 22 which has pivotally connected thereto a link 23, the same being also pivotally connected with one of the crank arms 14' so that on the turning of the shaft, the front wheels 16 will be moved to steer the vehicle.

The rear end of the shaft 21 is formed with an upwardly extending crank 24 which is exposed at the rear end of the vehicle and to which is detachably connected the controlling lever 25. This detachable connection is accomplished through the medium of a coupling yoke 26 pivoted to the lever 25 and formed with a keeper sleeve 27 receiving the crank 24 removably therein. The lever 25 is pivoted to the coupling yoke 26 for free vertical swinging movement to adjust the lever to desired position. The outer and upper end of the lever 25 is formed with a crank handle 28 so that it can be conveniently moved for controlling the steering mechanism of the vehicle. Also this lever 25 permits the pushing of the vehicle forward or the pulling of the same backwardly.

The pivotal connection of the link 23 with the crank arm 14' is accomplished through the medium of the end portion 17' of the rod 17 which extends below the crank arm 14' through which it is engaged. This downwardly extending end portion 17' is engaged through an eye 21' formed at the end of the link 23 distant from the arm 22, a suitable washer 23ª being provided between the eye 21' and the headed lower end of the portion 17'.

Arranged within the body A of the vehicle, is a dummy or false steering wheel 29 and column 30, the wheel 29 serving as a reproduction of the steering control of an automobile to complete the miniature appearance of the vehicle in simulating the latter.

What is claimed is:

The combination with a vehicle including an axle and wheels, of stub axle cranks pivoted to the axle for mounting the wheels thereon, connections between the cranks for moving the wheels in unison for steering the vehicle, a rod mounted upon the vehicle for rocking movement and extending rearwardly beyond the vehicle, connections between the rod and the cranks for movement of the cranks to shift the wheels when the rod is rocked, and a lever connected with the rod rearwardly of the vehicle and operable manually to rock the rod.

In testimony whereof, I affix my signature, in the presence of two witnesses.

MARSHALL R. DE LONG.

Witnesses:
 H. A. MILES,
 S. E. SPAHE.